(12) United States Patent
Gonthier et al.

(10) Patent No.: US 6,912,346 B2
(45) Date of Patent: Jun. 28, 2005

(54) OPTICAL FILTER DEVICE FOR TEMPERATURE DEPENDENCE CONTROL

(75) Inventors: François Gonthier, Montreal (CA); Lilian Martineau, Montreal (CA)

(73) Assignees: ITF Technologies Optiques Inc., Montreal (CA); ITF Optical Technologies Inc.

( * ) Notice: Subject to any disclaimer, the term of this patent is extended or adjusted under 35 U.S.C. 154(b) by 198 days.

(21) Appl. No.: 10/333,437

(22) PCT Filed: Mar. 11, 2002

(86) PCT No.: PCT/CA02/00333

§ 371 (c)(1),
(2), (4) Date: Jan. 21, 2003

(87) PCT Pub. No.: WO02/078135

PCT Pub. Date: Oct. 3, 2002

(65) Prior Publication Data

US 2003/0174957 A1 Sep. 18, 2003

(30) Foreign Application Priority Data

Mar. 23, 2001 (CA) ................................. 2342098

(51) Int. Cl.[7] .............................. G02B 6/00; G02B 6/26; G02B 6/293
(52) U.S. Cl. ........................... 385/43; 385/147; 385/37; 385/13
(58) Field of Search ............................... 385/13, 37, 39, 385/43, 136, 137

(56) References Cited

U.S. PATENT DOCUMENTS

| 5,042,898 A | | 8/1991 | Morey et al. ................. 385/37 |
| 5,999,671 A | * | 12/1999 | Jin et al. ....................... 385/37 |
| 6,049,414 A | | 4/2000 | Espindola et al. .......... 359/337 |
| 6,147,341 A | * | 11/2000 | Lemaire et al. ............... 385/37 |
| 6,377,727 B1 | * | 4/2002 | Dariotis et al. ............... 385/37 |

FOREIGN PATENT DOCUMENTS

| WO | WO 9906859 | 2/1999 | ............ G02B/6/00 |
| WO | WO 9947955 | 9/1999 | ............ G02B/6/293 |
| WO | WO 0102886 | 1/2001 | ............ G02B/6/28 |

OTHER PUBLICATIONS

G.W. Yoffe et al.; Passive temperature-compensating . . . ; Oct. 20, 1995; pp. 6859–6861; Applied Optics.
G.W. Yoffe et al.; Temperature-compensated optical-fiber Bragg gratings; Feb. 26, 1995; pp. 134–135; OFC '95 Technical Digest.

* cited by examiner

*Primary Examiner*—Akm Enayet Ullah
*Assistant Examiner*—Omar Rojas
(74) *Attorney, Agent, or Firm*—George J. Primak

(57) ABSTRACT

The invention provides an optical filter device which is particularly suitable for compensating the gain produced by an erbium doped fiber amplifier due to temperature variations. The device has a tapered fiber filter mounted on a rigid substrate, such as aluminium, in such a manner that the tapered portion of the filter does not come in contact with the substrate. The fiber of the filter is preferably made of silica.

10 Claims, 2 Drawing Sheets

OPTICAL FILTER DEVICE FOR TEMPERATURE DEPENDENCE CONTROL

FIELD OF THE INVENTION

This invention relates to a tapered optical fiber filter mounted on a rigid substrate, so as to form a device that enables to compensate for strong thermal dependence. For this purpose, the present invention provides a specially designed substrate on which the tapered fiber filter is affixed, so that it is possible to control the filter wavelength drift with changes in temperature and thereby compensate the shift of an optical amplifier exposed to temperature variations.

BACKGROUND OF THE INVENTION

Rare earth doped amplifiers, such as erbium doped fiber amplifiers (EDFA), are widely used in optical communication networks. Their gain is a function of the wavelength of the signal, which is temperature sensitive. As these networks evolved to several channels and are typically deployed in operating environments with changing temperatures, their thermal spectral dependence becomes a matter of concern. The solution of operating in temperature-controlled environment is energy consuming. An easier solution is to operate the device at a constant hot temperature, but the aging problems must then be faced. Filters have been proposed to compensate for the thermal spectral dependence. For example, U.S. Pat. No. 6,049,414 describes a design comprising a plurality of concatenated filters having center wavelengths which spectrally shift with temperature to compensate temperature-dependent shifts in the gain of the amplifier. This U.S. patent deals with a composite loss filter based on long period fiber gratings that maintains desired flatness of an EDFA even as the operating temperature changes. While this design appears to achieve the claimed goal of temperature compensation for the drift of the amplifier, it is complicated and requires the presence of a variable attenuator.

U.S. Pat. No. 5,042,898 discloses a temperature compensated Bragg filter, which is again a filter with embedded gratings. In this case, temperature compensation is achieved by mounting the filter on two compensating members, each made of a different material. One of the materials can be aluminum and the other stainless steel. These materials have such coefficients of thermal expansion relative to one another and to that of the fiber material as to apply to the fiber longitudinal strains, the magnitude of which varies with temperature in such a manner that the changes in the longitudinal strains compensate for those attributable to changes in temperature of the grating. This again is a fairly complex arrangement requiring juxtaposition of the two compensating members, with pre-loading features that can loosen or tighten the arrangement to the extent needed for the grating region to be reflective to light in the narrow region around the desired wavelength.

In the article entitled "Passive temperature-compensating package for optical fiber gratings" by G. W. Yoff et al., published in Applied Optics, Vol. 34, No. 30, Oct. 20, 1995, the problem of passive temperature compensation for optical fiber gratings is again addressed. The authors use a compact package also comprising two materials with different coefficients of thermal-expansion. The idea expressed in this article is to choose one material with a low thermal-expansion coefficient $\alpha$, such as silica ($\alpha=5\times10^{-7}/°$ C.) and another material with a high thermal expansion coefficient, such as aluminum ($\alpha=2.5\times10^{-5}/°$ C.) or stainless steel ($\alpha=1.7\times10^{-5}/°$ C.), rather than two materials with a small difference between the expansion coefficients. Apart from providing a more compact device, the filter of this article is still a complex Bragg filter based on gratings and requires mounting of the two materials with different thermal-expansion coefficients with adjustable tension relative to each other.

All the above discussed filters are based on gratings imprinted in the core of the fiber and forming discontinuities so that when the light is launched into the fiber core for guided propagation, only that having a wavelength within a narrow range can pass in the propagation direction. This is quite different from the tapered fiber filters of the present invention, although, as stated in applicant's International PCT application WO 01/02886, the basic principle of compensating the temperature dependent optical effect applies equally to Bragg gratings and to tapered fiber filters. In this International application, applicant has disclosed a combination of an optical component, such as a tapered fiber filter, being solidly secured to a rigid substrate that produces a mechanical stress to effect elongation of the component so as to compensate for any modal phase shift due to temperature variation. Also, the mechanical phase dependence of the component may be adjusted in relation to the substrate to provide the desired temperature compensating effect. The substrates used for the above purpose were special types of silica glass having thermal expansion coefficients greater than quartz. Such devices are, however, not suitable for very strong temperature dependence that is normally required in EDFA.

OBJECTS AND SUMMARY OF THE INVENTION

It is an object of the present invention to provide a novel tapered fiber filter device that enables to compensate for strong thermal dependence of the order of $-250$ picometers/° C.

Another object is to provide a tapered fiber filter device of simple construction that is particularly suitable for compensating the shift of an optical amplifier exposed to temperature variations.

Other objects and advantages of the invention will be apparent from the following description thereof.

In essence, this invention is based on a careful selection of the substrate material on which to fix the tapered fiber filter, and to the design of said substrate, so that the wavelength shift of the filter with temperature exactly compensates that of the amplifier. More specifically, the invention is based on wavelength dependence resulting from the temperature dependence of the wavelength and on the thermal expansion of the different materials involved in the device, as embodied by the following relation:

$$\frac{d\lambda}{dT_{compensated}} = -\frac{d\lambda}{dL}(CTE_{substrate} - CTE_{fiber})L + \frac{d\lambda}{dT_{non-compensated}}$$

where $$\frac{d\lambda}{dL}$$

is the wavelength dependence over the length of the fiber labelled L, as defined by the heating and drawing process. The product $$\frac{d\lambda}{dL}$$

L is defined by geometrical design. ($CTE_{substrate}-CTE_{fiber}$) refers to the difference in thermal coefficients between the material of the substrate and that of the fiber, typically silica; this term only depends on the choice of materials. The minus sign relates to the fact that the wavelengths shift to smaller values upon heating.

Typically, the desired wavelength shift with temperature, referred to as $$\frac{d\lambda}{dT},$$

is of the order of −250 pm/° C. The silica of the fiber has a CTE of about $5.10^{-7}$ mm/° C. A material of high CTE is selected for the substrate, such as Aluminum T6061 ($24.10^{-6}$ mm/° C.), which is a common aluminum alloy and is easily machined. The difference in CTE is fixed by this choice. The amplitude of the term $$\frac{d\lambda}{dL}$$

L remains to be adjusted to achieve the desired shift, knowing that the wavelength shift due to the tension of the optical fiber is in the range of 0.2 to 0.3 nm/μm. The material of high CTE should preferably have a CTE above $20.10^{-6}$ mm/° C. which would be substantially stable over the range of temperatures for which the filter is designed. Aluminum and aluminum alloys are preferred materials for this purpose.

The substrate geometry is preferably designed to allow a precise control of the free length of the fiber, referred to as L, as defined by the distance between the mounting points of the fiber on the substrate so that the fiber does not come in contact with the substrate in the region L where it is tapered. The fiber, preferably pre-strained, is attached to opposite sides of the filter region to said substrate with adhesive seals formed and locked within a recessed void in the substrate. The recessed voids secure the placement of the adhesive. The component is held in place by a quick UV cured adhesive, then secured by a thermal adhesive on either end of the device, inside the previous adhesive points. Both adhesives are deposited on the bare fiber. Lengths of cladded fiber are maintained on each side of the bare region of the fiber so as to ensure mechanical strength. A lateral wall on each side of the groove provides additional mechanical strength to the assembly.

Summarizing, therefore, according to the present invention, there is provided an optical filter device for compensating strong thermal dependence, which comprises a tapered fiber filter mounted on a rigid substrate having a high coefficient of thermal expansion (CTE), said filter being mounted on the substrate so that the tapered portion of the filter does not touch said substrate. In this manner, there is provided a temperature-controlled filter device which permits the control of the gain of an amplifier in the temperature range between about −5 and +70° C.

DETAILED DESCRIPTION OF THE INVENTION

A preferred embodiment of the invention will now be described with reference to the appended drawings.

Figure 1:
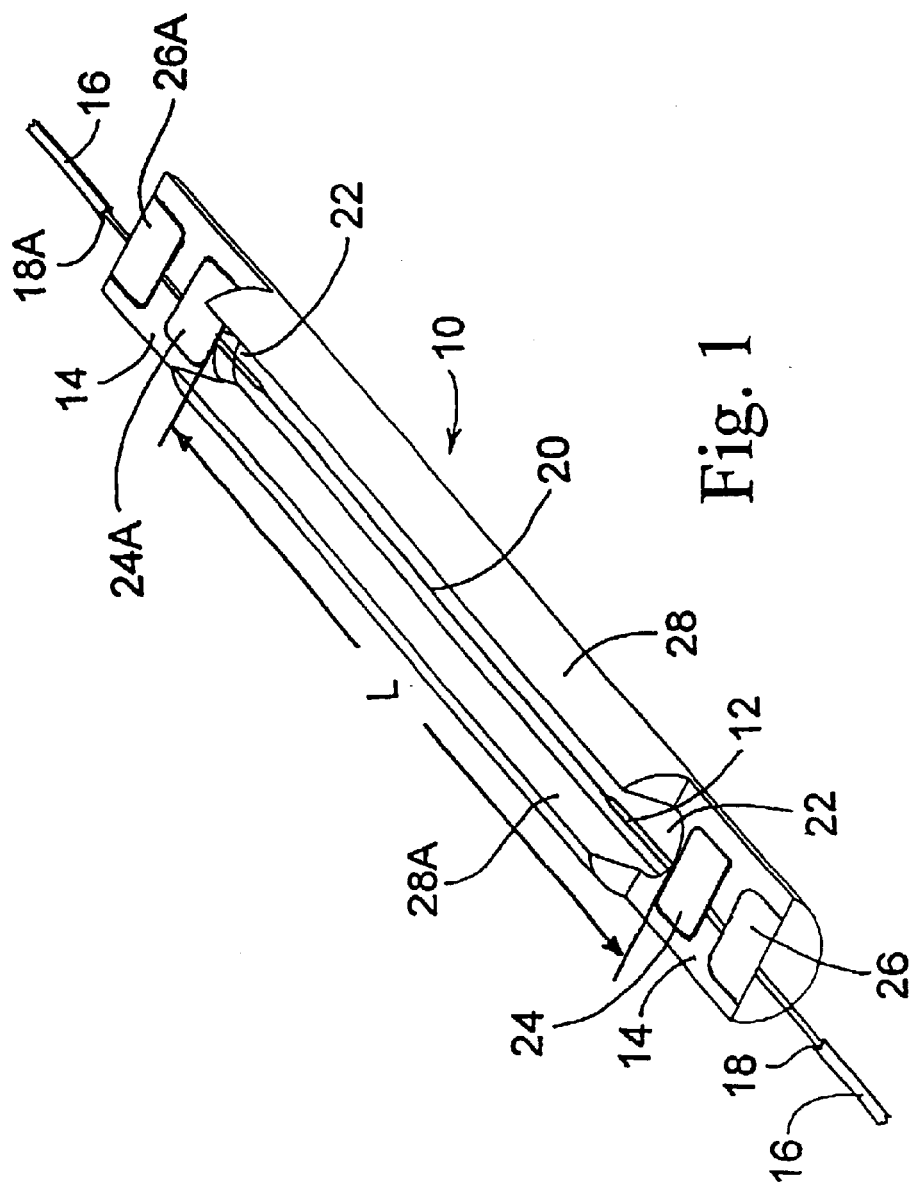
FIG. 1 is a perspective view of an optical filter device in accordance with a preferred embodiment of the present invention.

FIG. 1 illustrates a preferred design of the optical filter device 10 of the present invention. It comprises a tapered optical fiber filter 12 mounted on a rigid substrate 14 of high CTE, which in this case is made of Al T6061. The optical filter is made-up of a silica fiber 16 having a positive CTE of $5.10^{-7}$ mm/° C., stripped of its jacket at points 18, 18A and having a tapered portion 20 in the middle. The rigid substrate 14 is provided with an elongated recess 22 and the filter 12 is attached to the surface of the substrate 14 at each end of the recess 22 by means of suitable adhesive bonds 24, 24A and 26, 26A. Bonds 24, 24A are preferably made of thermal adhesive and bonds 26, 26A of a quick UV cured adhesive. Length L of the filter 12 positioned over the recess 22 is the relevant length defined by the heating and drawing process of bare fiber, over which the wavelength dependence of the filter is measured. In this particular case, L=2.6 cm. Filter 12 is preferably slightly strained before being mounted on the substrate 14. Moreover, the substrate is also preferably provided with lateral walls 28, 28A to impart additional mechanical strength to the assembly.

Figure 2:
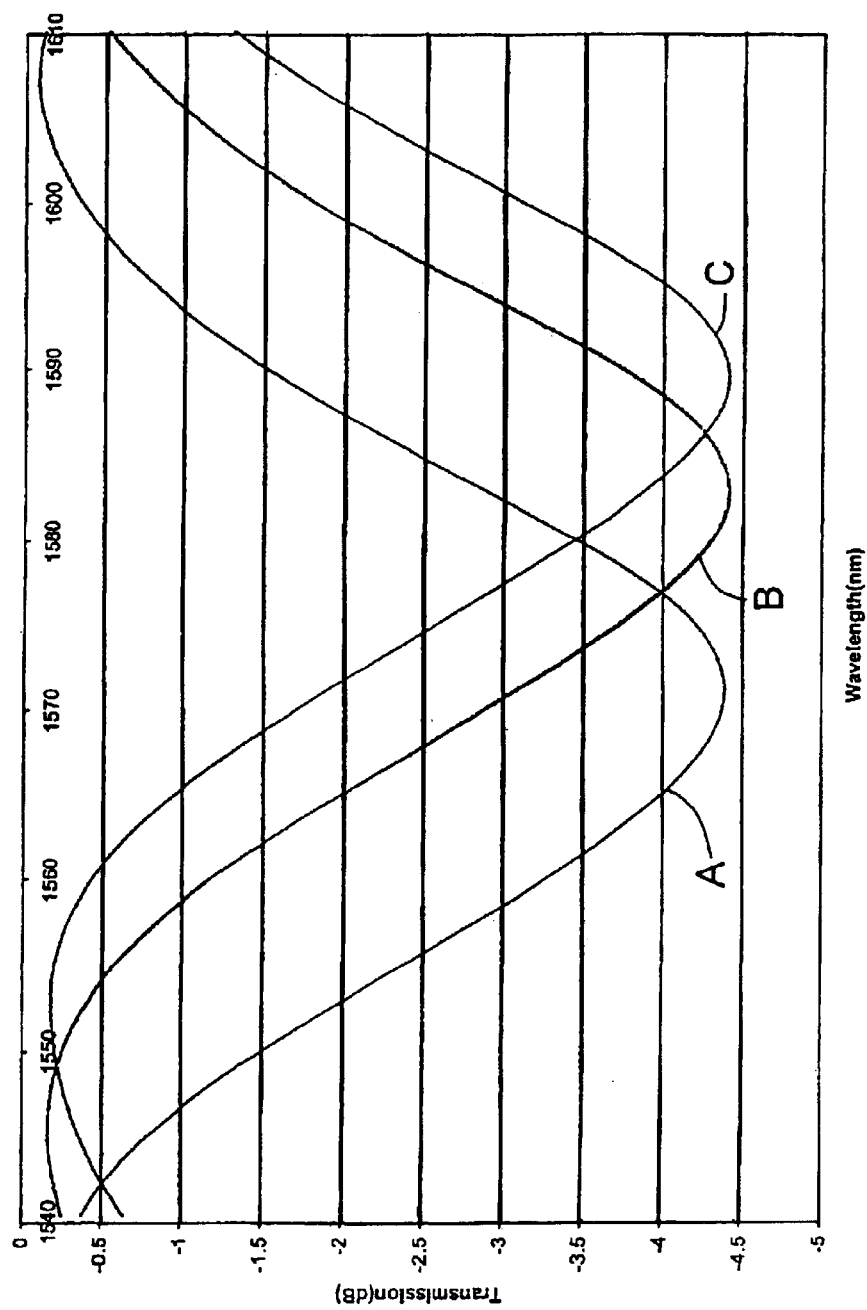
FIG. 2 is a graph showing transmission curves versus wavelength at three different temperatures produced by the filter device of the present invention.

FIG. 2 shows curves A, B and C of transmission in dB vs. wavelength in nm obtained using the filter device of FIG. 1 at temperatures of 70° C., 22° C. and −5° C. respectively. The wavelength drift illustrated by these curves at the different temperatures compensates for the gain of the EDFA due to temperature variation. The filter device 10 is thereby shown to be operable in the temperature range of between −5° C. and +70° C.

The invention is not limited to the preferred embodiment described above, but various modifications obvious to those skilled in the art may be made without departing from the invention and the scope of the following claims.

What is claimed is:

1. An optical filter device suitable for compensating strong thermal dependence, comprising a tapered fiber filter mounted on a rigid substrate having a high coefficient of thermal expansion (CTE), said filter being mounted on the substrate so that the tapered portion of the filter does not come an contact with said substrate, adapted to produce a compensating effect based on wavelength dependence resulting from temperature dependence of the wavelength of the tapered fiber filter and on different thermal expansion of the fiber filter and the substrate materials.

2. An optical filter device according to claim 1, wherein the substrate has an elongated recess over which the tapered portion of the filter is mounted.

3. An optical filter device according to claim 2, wherein the tapered fiber filter is mounted on the substrate by means of adhesive bonds on each side of the recess.

4. An optical filter device according to claim 1, wherein the tapered fiber filter is mounted on the substrate in a pre-strained condition.

5. An optical filter device according to claim 1, wherein the substrate is made of a material having a CTE adapted to compensate for a strong thermal dependence of the order of −250 pm/° C.

6. An optical filter device according to claim 1, wherein the substrate is made of a material that is readily formable into a desired shape.

7. An optical filter device according to claim 1, wherein the substrate is made of aluminum or an aluminum alloy.

8. An optical filter device according to claim 1, wherein the fiber filter is made of silica.

9. An optical filter device according to claim 1, adapted to compensate a gain produced by an erbium doped fiber amplifier due to temperature variations.

10. An optical filter device according to claim 1, which is operable at temperatures between about −5° C. and 70° C.

* * * * *